US006766305B1

(12) United States Patent
Fucarile et al.

(10) Patent No.: US 6,766,305 B1
(45) Date of Patent: Jul. 20, 2004

(54) LICENSING SYSTEM AND METHOD FOR FREELY DISTRIBUTED INFORMATION

(75) Inventors: Lori J. Fucarile, Melrose, MA (US); Susan B. Hoover, Barrington, IL (US); Murray S. Mazer, Arlington, MA (US); Mary C. Murphy, Bedford, MA (US); Stephen A. Ward, Watertown, MA (US); Patrick J. Lopresti, Cambridge, MA (US)

(73) Assignee: Curl Corporation, Cambridge, MA (US)

( * ) Notice: Subject to any disclaimer, the term of this patent is extended or adjusted under 35 U.S.C. 154(b) by 0 days.

(21) Appl. No.: 09/267,269

(22) Filed: Mar. 12, 1999

(51) Int. Cl.⁷ .............................................. G06F 17/60
(52) U.S. Cl. ............................. 705/51; 717/120; 705/1
(58) Field of Search ........................... 705/51, 52, 59, 705/1, 57; 717/4, 120

(56) References Cited

U.S. PATENT DOCUMENTS

| 5,287,408 | A | | 2/1994 | Samson ........................ 380/4 |
|---|---|---|---|---|
| 5,724,425 | A | * | 3/1998 | Chang et al. .................. 705/52 |
| 5,745,765 | A | | 4/1998 | Paseman |
| 5,790,664 | A | | 8/1998 | Coley et al. ................... 380/4 |
| 5,950,001 | A | | 9/1999 | Hamilton et al. |
| 5,963,953 | A | | 10/1999 | Cram et al. |
| 6,059,838 | A | * | 5/2000 | Fraley et al. .................. 705/59 |
| 6,189,146 | B1 | * | 2/2001 | Misra et al. .................. 717/11 |
| 6,226,747 | B1 | * | 5/2001 | Larsson et al. ............... 705/51 |
| 2001/0011254 | A1 | * | 8/2001 | Clark ........................... 705/59 |

FOREIGN PATENT DOCUMENTS

| EP | 0 686 906 A2 | 12/1995 | ............. G06F/1/00 |
|---|---|---|---|
| WO | WO 98/25373 | 6/1998 | |
| WO | WO 98/45768 | 10/1998 | ............. G06F/1/00 |

OTHER PUBLICATIONS

"Calico Commerce: Calico launches advance interactive selling configuration software: Network Advisor enables component–based modeling for rapid configuration of highly complex products and services," *M2Presswire* (Aug. 2001).

M. Hostetter et al., "Curl: A Gentle Slope Language for the Web", *MIT Laboratory for computer Science World Wide Web Journal*, vol. II(2), Spring 1997.

* cited by examiner

*Primary Examiner*—Sam Rimell
(74) *Attorney, Agent, or Firm*—Hamilton, Brook, Smith & Reynolds, P.C.

(57) ABSTRACT

The present invention provides a licensing mechanism allowing for different forms of license for use in an environment of interconnected servers providing content. The invention comprises both methods and a system for licensing individual content based upon the nature of the use, thus facilitating the distribution of content without a license for non-commercial purposes and content with a license for commercial purposes. The system utilizes a special form placed within the content, the form containing either a legal assertion of the non-commercial nature of the use, or an identification of the licensee and other related data. If the form includes an identification of the licensee, a license server may be contacted to validate the license. The invention also includes a licensing tool or server to generate the appropriate form for insertion within the content.

24 Claims, 12 Drawing Sheets

LICENSING SYSTEM AND METHOD FOR FREELY DISTRIBUTED INFORMATION

FIELD OF THE INVENTION

The present invention relates generally to systems and methods for controlling and monitoring use of computer programs and more specifically to systems and methods for embedded licensing in a distributed computer environment.

BACKGROUND OF THE INVENTION

The Internet, and particularly the World Wide Web within the Internet, has become a popular vehicle for widespread access to content of nearly arbitrary kinds, among them formatted text, graphics, and interactive programmed content. Associated with various types of content are conventions or languages for representation of the content as strings of bits (or, equivalently, as strings of characters) in network communications. Currently popular representations for web communications include HTML for formatted text, JPEG for images, and JAVA for programs. The CURL Language, recently developed at the Massachusetts Institute of Technology (*Curl: A Gentle Slope Language for the Web*, M. Hostetter, D. Kranz, C. Seed, C. Terman, S. Ward, MIT Laboratory for Computer Science World Wide Web Journal, Volume II, Issue 2, Spring 1997), is designed to represent a variety of content forms within a single language.

Access to content by a user requires software on that user's computer (the "client") which (a) fetches the content, represented in some identifiable language, from either a local storage medium (e.g. CDROM or hard disk) or a remote computer (the "server") and (b) "executes" or "interprets" the fetched representation appropriately. Typically these client operations are performed via a client application called a "browser", e.g. Microsoft Internet Explorer (Microsoft Corporation, Redmond, Wash.) or Netscape Communicator (Netscape Corporation, Mountain View, Calif.). These browsers include the capability to interpret several content representations (such as HTML and JPEG), and provide for their extension to accommodate new content types (such as the CURL Language). To access content represented using the CURL Language, for example, a software extension to the browser (a "plug-in") designed to understand the CURL Language would be installed on the client machine. Thereafter, control is passed to the plug-in whenever CURL Language content is encountered, whereupon the plug-in interprets or executes the CURL Language content.

One reason for the success of the web is its promotion of unencumbered communications. An unambiguous identifier of information (e.g., a Uniform Resource Locator or URL) is typically all that is needed to enable access to content, a feature that has promoted the rapid evolution of the web into a rich nexus of interrelated content. While unconstrained access to information is valuable to the growth of the web and the electronic economy, it runs counter to conventional licensing models. Free and easy access to useful web content removes the motivation of those who enjoy its advantages to properly license and contribute revenue to the content supplier because it is difficult to control access and thus charge for information and services. Consequently, typical for-profit publishers of valuable content—computer programs, timely information, and other information—forego strict licensing and encourage revenues by promoting an artificial scarcity of the commodity they provide. In the case where a provider supplies content as well as the client software needed to interpret that content (such as a browser plug-in), access restrictions might be used. Such restrictions could be applied to the content itself, to the plug-in, or to both.

Typical access restriction measures in current use tend to impede the open unencumbered communications that are the hallmark of the web. Such restrictions include passwords keyed to the user or passwords keyed to a hardware identification number attached to a specific computer and thus used to unlock the software or content. Password mechanisms can effectively limit the use of the software to a specific individual and/or specific machine but at the same time impede the web's unencumbered communications and further fail to scale for widespread use. Every user or provider of content must be provided a password to unlock the software or content.

Other mechanisms include removable devices containing a unique license key and adapted to connect to a general-purpose communications port or specific interface. In this method, the software looks for a specific code contained in the removable device each time the software is activated. Again, such a mechanism can effectively limit the use of the software to a specific individual and/or specific machine, but fails to scale for widespread use and thus impedes unencumbered communications.

Networked computer environments provide further licensing challenges. For instance, a user in one client may utilize software running at a second client. Consequently, the terms of the traditional single-computer software license might not properly cover the usage of the software on the network or may unintentionally allow such a usage without additional compensation to the licensor. One solution to this problem is to grant a license to use the software to all of the machines on a network (unlimited site license), or to require a license for each machine (limited site license). While this increases the licensor's fees, it may also require the licensee to pay more than what is required for the licensee's needs. In addition, this mechanism requires cooperation from the licensee to contact the licensor as additional nodes are added to the network. Additional non-automated mechanisms are available to control and monitor usage. For example, licensors may obtain the right to periodically audit the licensee's site to monitor usage, an inefficient and intrusive process.

In a situation where a licensor develops tools used by a licensee to create programs and content for an end-user, a further tension exists. The licensor may want an accurate accounting of the use of the licensed content while the ultimate end-user wants unencumbered access without passwords and locks. The licensee is thus caught between providing the licensor an accurate accounting to determine the license fee while at the same time providing easy access to the end-user. Current mechanisms that satisfy the licensor have an unfavorable impact on the end-user, and vice-versa.

Moreover, the developer of content might wish to encourage multiple levels of licensing to the end-user. The levels of licensing may run from free access to the product (or portions of the product) for certain uses (e.g. for evaluation or non-commercial use) to for-pay access to the product with a fee based on the portions of the product accessed and the number of times accessed. Conventional access restrictions constitute an impediment to free access by users, since such users must typically "register" with the access control mechanism or deal with similar electronic bureaucracy, and are an impediment to for-pay access because of the overhead required to monitor such licensing forms. Thus, present licensing technologies do not provide a broad mechanism capable of covering such divergent licensing goals.

SUMMARY OF THE INVENTION

The invention provides a new and improved licensing method and system for licensing content and access to functions provided by a plug-in, application, applet or any client software operating in a computer. In addition, the invention facilitates the distribution of both revenue and non-revenue generating content on the Internet.

The invention includes a system and method for managing access to functionality provided by a software component or plug-in running on a client computer. The steps executed include maintaining a store of license records for software items that may include programs or modules. Each of the license records includes an identification of a licensee and an associated level of functionality for that licensee. This information is used to define an access policy for the licensee that is used to determine what access is granted to the licensee to the software items.

The client retrieves content for running on the client that requires access to the plug-in in order to operate. The content contains a license form containing either a licensee identity or an operational policy, such as a statement of non-commercial use.

The client scans the content for the license form, and if the license form contains the operational policy, then performing the steps of testing the operational policy to check if it is valid, and if so, allowing the plug-in to operate on the content as determined for that type of operational policy.

If the license form contains a licensee identity, then the client retrieves the license record from the store, and determines an access policy for the licensee based upon at least the information in the licensee record. The client then allows the plug-in to operate on the content to the extent allowed by the access policy.

Thus, in brief, the invention includes a plug-in or application running on a user computer. The plug-in is adapted to access content on a content server. The content includes a special licensing form and the plug-in is further adapted to scan the content for such licensing form.

Depending on the information included in the licensing form, the plug-in determines if the license governing the content is an implicit or explicit license. An implicit license can be validated without contacting any additional servers. An explicit license requires contacting the appropriate licensing server to validate the license. If the license is valid, the content is processed.

The plug-in can be adapted to cache license results in order to minimize the need to contact the license server. The cached result can then be used to validate the license for related content without contacting the server. The cached result can be invalidated by the passage of time, reaching a specified number of accesses, or other reason.

A grace period can be defined allowing processing of content in the case where the user computer cannot contact the license server and there is no appropriate cached license. The grace period can allow for temporary operation until the user computer is back in contact with the license server.

The plug-in can be adapted via the use of a file authentication mechanism to ensure that the content file is not corrupted. In addition, the license form or license server can specify the level of functionality allowed under the license, thus allowing licensing on a module-by-module basis.

The license server can be adapted to hold license records and receive and store access information such as number of accesses, user information, machine information and module information. The license server can then generate usage reports that can be used to determine licensing requirements.

The invention further includes a tool for creation of the license form. The tool can be a stand alone software program delivered to a licensee or a server provided by the licensor and available to the licensee via a communications channel.

All communications and data of the invention may be secured via standard encryption mechanisms, thus providing additional protection.

Therefore, it is an advantage of the invention to support a licensing mechanism by which the provider of software utilized in the interpretation of web content may license the use of that software for commercial purposes without controlling access to either the software or the content.

Further advantages of the invention include the ability to allow noncommercial or other specific use of the software, anonymous use of the software, and unencumbered use of the software.

Additional advantages of the invention allow the licensor to monitor licensed usage, to revoke the license as desired, and to charge fees based upon the usage of the software by the licensed content.

In addition, it is also an advantage of the invention to utilize a plain-text assertion embedded in the content stating that the content is for non-commercial use.

Further advantages of this invention provide for multiple licensors, each administering separate licenses pertaining to interdependent content modules.

Other advantages of the invention will become apparent to one of ordinary skill in the art in view of the figures and detailed description of the embodiments of the invention.

BRIEF DESCRIPTION OF THE DRAWINGS

The foregoing advantages of the invention will be more readily understood by reference to the following description taken with the accompanying drawings in which.

DETAILED DESCRIPTION OF THE PREFERRED EMBODIMENTS

The following description of the invention is illustrative, and reflects concrete choices for purposes of illustration only. Many alternative embodiments of this invention will be obvious to those skilled in the art.

The invention facilitates the widespread use and distribution of computer programs while allowing developers of those computer programs a mechanism for garnering a financial return for their development. This is accomplished by retaining control over the operations of the computer and its programs so that non-commercial users of the computer programs have free access (with possible limitations) while commercial users pay a license fee for access to the operation of the computer programs.

The invention comprises a freely distributed software module consisting of a program or plug-in that runs on a computer. Once in operation on the computer, the module controls access to the computer programs by subsequently loaded content. Access is controlled by the use of a special licensing form that must be present in the content in order for access to be granted. The module interprets this special licensing form and grants access based upon the information in the licensing form. The licensing form specifies the nature of the content—non-commercial or commercial content. The module has a built-in understanding of a non-commercial licensing form and can grant free access to the computer programs. The module also recognizes licensing forms of a commercial nature and can impose further licensing validation steps (to ensure payment of a license fee for commercial use) prior to accessing the computer programs. Thus, the module has a built in understanding of different types of content and can grant immediate access to the computer programs by non-commercial content while preserving control over access to the computer programs by commercial content. This encourages the development of content by allowing free access to the computer programs for non-commercial use while at the same time providing a mechanism for developers of the computer program to receive a financial return by requiring a license fee for commercial use.

Figure 1:
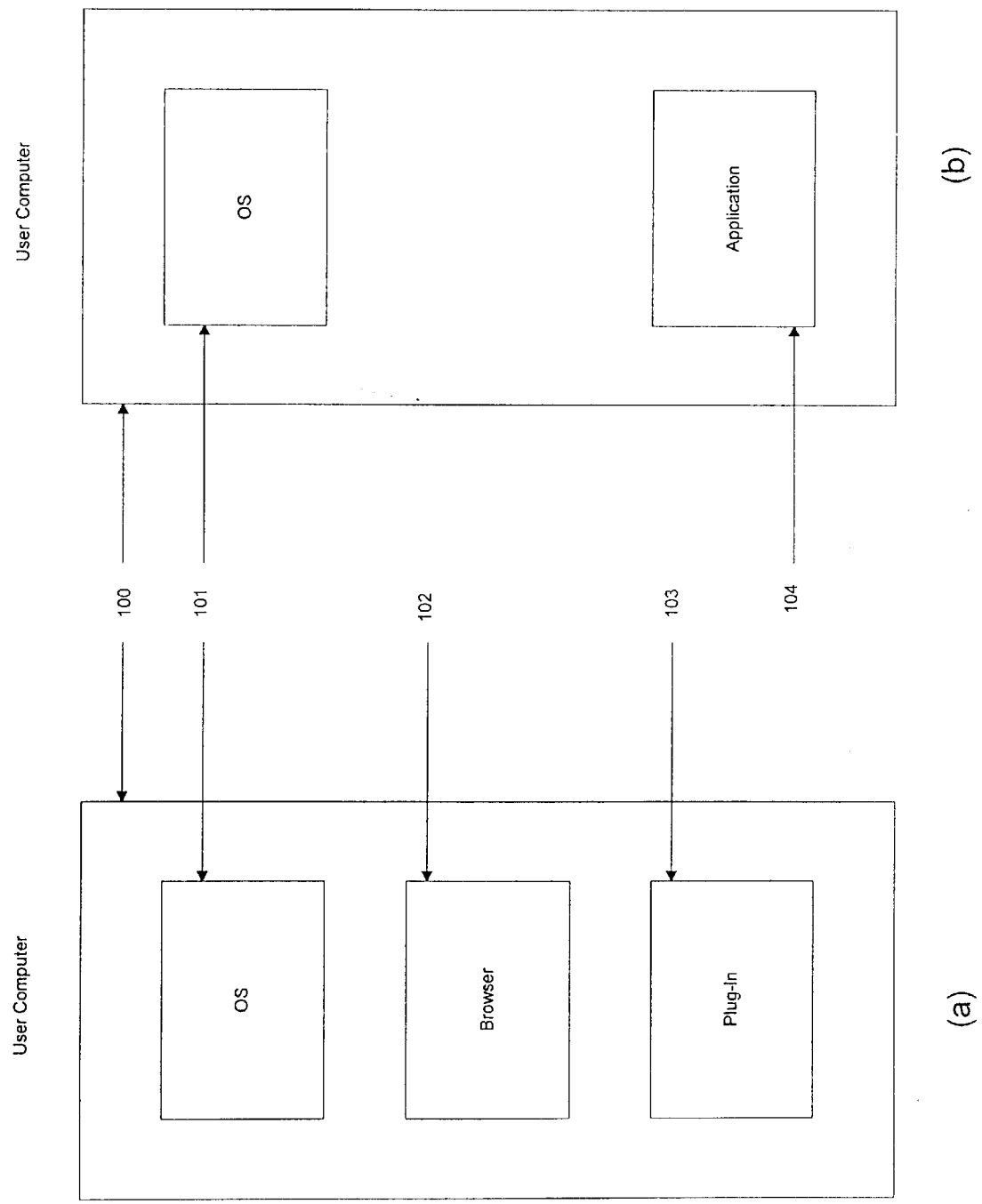
FIG. 1 is a block diagram illustrating a computer system with a plug-in or application for receiving licensed content according to the invention.

FIG. 1(a) and FIG. 1(b) are block diagrams of embodiments of a computer system implementing the invention. The system utilizes a computer 100, running an operating system 101. The computer 100 can be a conventional personal computer (e.g. as produced by Compaq Computer Corporation, IBM and Apple) while the operating system 101 is selected according to the underlying computer (e.g. Microsoft Windows 98, Microsoft Windows NT, Linux, Apple OS etc.)

With reference to FIG. 1(a), one embodiment of the invention utilizes a browser 102 as a substrate for a plug-in 103. Examples of such a browser 102 includes Internet Explorer (Microsoft Corporation, Seattle, Wash.) and Netscape Communicator (Netscape Corporation, Mountain View, Calif.) but can be any other browsers as long as they provide an interface to a plug-in. FIG. 1(b) illustrates an alternative embodiment of the invention where an application 104 is provided to replace browser 102 and the plug-in 103. In these embodiments, the mechanism for controlling access to computer programs and the computer programs are combined, but one of ordinary skill in the art would appreciate that the control portion could be separated from the underlying computer programs.

The browser 102—plug-in 103 combination or application 104 are designed to interpret and execute content received by the computer 100. In particular, they are designed to process the licensing mechanism as taught by the invention. While the remaining description refers generally to the plug-in 103 operating under the browser 102, it is understood by one of ordinary skill in the art that the application 104 may be used interchangeably.

Figure 2:
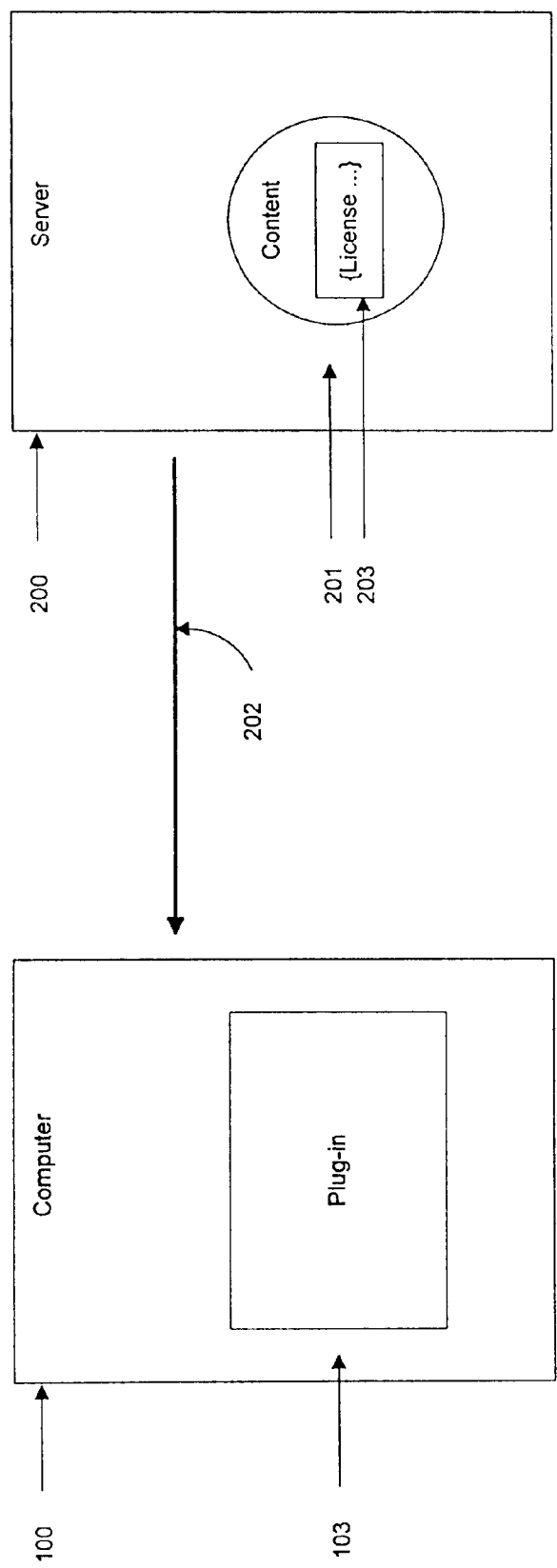
FIG. 2 is a block diagram illustrating a computer system with a plug-in or application for receiving licensed content and a server for providing such content according to the invention.

Turning to FIG. 2, the general operation of the plug-in 103 is to receive and process content 201 from a server 200 using standard communications techniques. Content 201 is coded in a language or representation (such as the CURL Language) that the plug-in 103 or application 104 running on the client 100 can ultimately receive and process. Although a variety of alternative content representations (e.g. HTML, Java, XML), data forms (e.g. text, graphics, executable code) and encodings (e.g. text, binary or encrypted codings) may be used, the invention is described herein for content 201 encoded as unencrypted plain text CURL Language source code for simplicity. In addition, the content 201 may be bundled into separate files, each of which constitutes a functional module (such as a web page or program module).

Under the invention, a content file licensed to operate under the plug-in of the invention is distinguished by a special licensing construct within the file, for example illustrated here by the CURL Language source code text:

{License . . . } where the ellipses denote further parameters to be described shortly. The plug-in 103 is adapted to detect such a {License . . . } form in every file delivered to it for execution, and to refuse execution of any file whose {License . . . } form is missing or invalid (perhaps also reporting an error to the user of the client machine, the source of the content or the plug-in provider). In addition, the invention can allow for differing licensing schemes by providing different or additional information in the {License . . . } form.

Under the invention, the plug-in 103 defers useful processing of the content (e.g. execution or interpretation of code within the content) until it has encountered a {License . . . } form 203 contained within. Typically, such {License . . . } forms will be at the beginning of each content file, allowing remaining content to be executed incrementally after validation of the {License . . . } form. The {License . . . } form is used by the plug-in to control access to content 201, plug-in 103 or both. In other words, the {License . . . } form is processed by the plug-in in order to determine the extent to which the content 201 is processed. Depending upon the information in the {License . . . } form, the final processing of the content 201 and access to any or a portion of the functionality of the plug-in 103 can be controlled.

Thus, when content 201 is to be interpreted by the client 100, its contents are delivered to the plug-in 103, the {License . . . } form is extracted and processed, and the plug-in executes or interprets the content to the extent allowed by the {License . . . } form.

Figure 3:
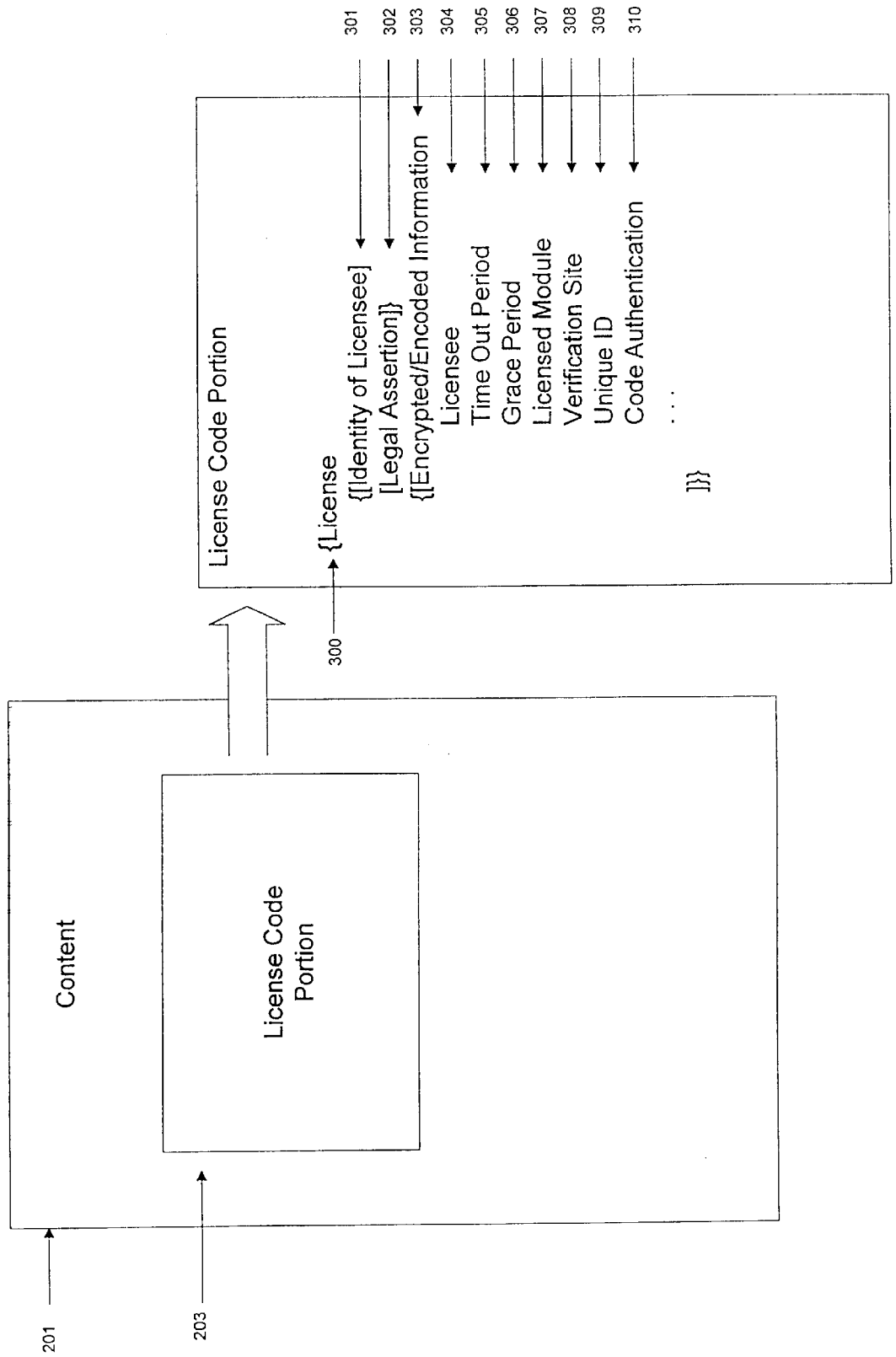
FIG. 3 is a block diagram illustrating the composition of the {License . . . } form according to the invention.

FIG. 3 illustrates an embodiment of the {License . . . } form 300. In this illustration, the {License . . . } form 300 contains a variety of information, including:

Identity of Licensee 301—this information identifies the licensee. In one embodiment of the invention this information is kept as plain text but in other embodiments it may also be encrypted. The licensee is the party providing the content executed by the plug-in.

Legal Assertion 302—this identifies the legal form of the license. In one license form, the content is being utilized for non-commercial use and thus can be distributed without payment of a royalty under a non-commercial use license. In other license forms, this would specify a type of license. The assertion is appropriate for the licensed use and should be a plain text string containing a legal assertion by the licensee as to the nature of the content. It is anticipated that the assertion is appropriate for the licensee's jurisdiction, conforms to the laws governing the licensee and thus can be used to judicially enforce the licensor's rights.

Encoded/Encrypted Data 303—A variety of data may be provided in encrypted form. This data contains the binary representation of a data structure (described below) and may be encoded as a sequence of plain-text characters using known techniques (such as uuencode). In the embodiment implemented for the CURL Language, the data is quoted so that it becomes a syntactically legal element of the language (viz., a quoted string). Significant functions served by the encoded binary data are:
1. Secure identification of the licensee and the specific contractual arrangements pertaining to the license; and
2. Authentication of the content in the remaining portions of the file (outside of the {License . . . } form, specializing each {License . . . } form to the specific file for which it was generated.

The following are examples of data that may be encoded/encrypted:

Licensee 304—Represents the identity of the licensee. This can be used to confirm the licensee identity and can be a text string or numeric identifier. For example, a particular contract pertaining to the license/licensee in question can be assigned a unique identifier C within the licensor's database; then the reliable encoding of identifier C serves to identify the licensee and contractual arrangements—the first of the noted functions.

Time Out Period 305—A period in which the license is valid. Can be used as an optimization of the verification phase of the license.

Grace Period 306—Period of time to allow use without verification of the license. Can be used as an optimization of the verification phase of the license.

Licensed Modules 307—Extent of the license. This data can be used as part of a mechanism to control access to the plug-in functionality on a module-by-module basis. This allows licensing of only a portion of the plug-in functionality.

Verification Site(s) 308—The network location(s) to use as an authorization and verification site for the content license, as further explained herein Unique ID 309—An identifier used to identify the end user, the party actually downloading the content. This would allow a mechanism to track usage by the actual end-user of the content.

Authentication Code 310—Information to verify that the code attached to the license has not been corrupted or tampered with. Implemented via a Message Authentication Code or MAC computed from the remainder of the file, using known techniques (such as cipher-block chaining), thus providing the second noted function.

One of ordinary skill in the art would understand that additional data fields might be provided within {License . . . } form 300.

{License . . . } form 300 allows for different types of licensing schemes for content. For example, the plug-in creator may wish to choose a policy that encourages use of the plug-in for certain free distribution purposes, e.g. non-commercial use or product evaluation. To support such uses, in one embodiment the plug-in will accept certain variants of the {License . . . } form 300 without further validation. For example, the {License . . . } form 300 may look like:

{License for non-commercial use under the terms of Curl Corporation contract number C00001.}

This form contains only a plain text legally binding assertion appropriate for the intended use—here, that the content is for non-commercial use for which Curl Corporation requires no further licensing arrangements. In this approach, the licensor depends upon the plain-text legal assertion stating clearly the non-commercial nature of the content within the {License . . . } form itself, as well as ordinary legal remedies, to prevent abuse. This legal assertion is readily viewable by anyone with access to the content, and thus clearly states the intended non-commercial nature of the content. This type of {License . . . } is termed an implicit license because the plug-in has sufficient built-in information to grant access.

Alternatively, the plug-in creator may wish to choose a policy that encourages use of the plug-in for certain controlled distribution purposes, e.g. commercial use or secure access. Thus, in further embodiments of the invention, the plug-in is adapted to accept certain variants of the {License . . . } form 300 that requires further validation. For example, in this case the {License . . . } form 300 may look like:

{License by XYZ Computer Corporation ["101010111001 . . . 0010101001000010010001"].}

This form contains an identification of the licensee and additional information (illustrated here by the sequence of binary digits) representing the encrypted information 303 of FIG. 3.

In this form of operation, the encrypted information 303 is decrypted by the plug-in. Additional operations are then performed by the plug-in to verify the content including verification that the file has not been edited or otherwise tampered with and checking the current status of the license by a brief exchange of messages with a license server maintained by the Licensor. This type of {License . . . } form is termed an explicit license because the plug-in has insufficient built-in information to grant access and must validate access by resorting to additional external information.

Figure 4:
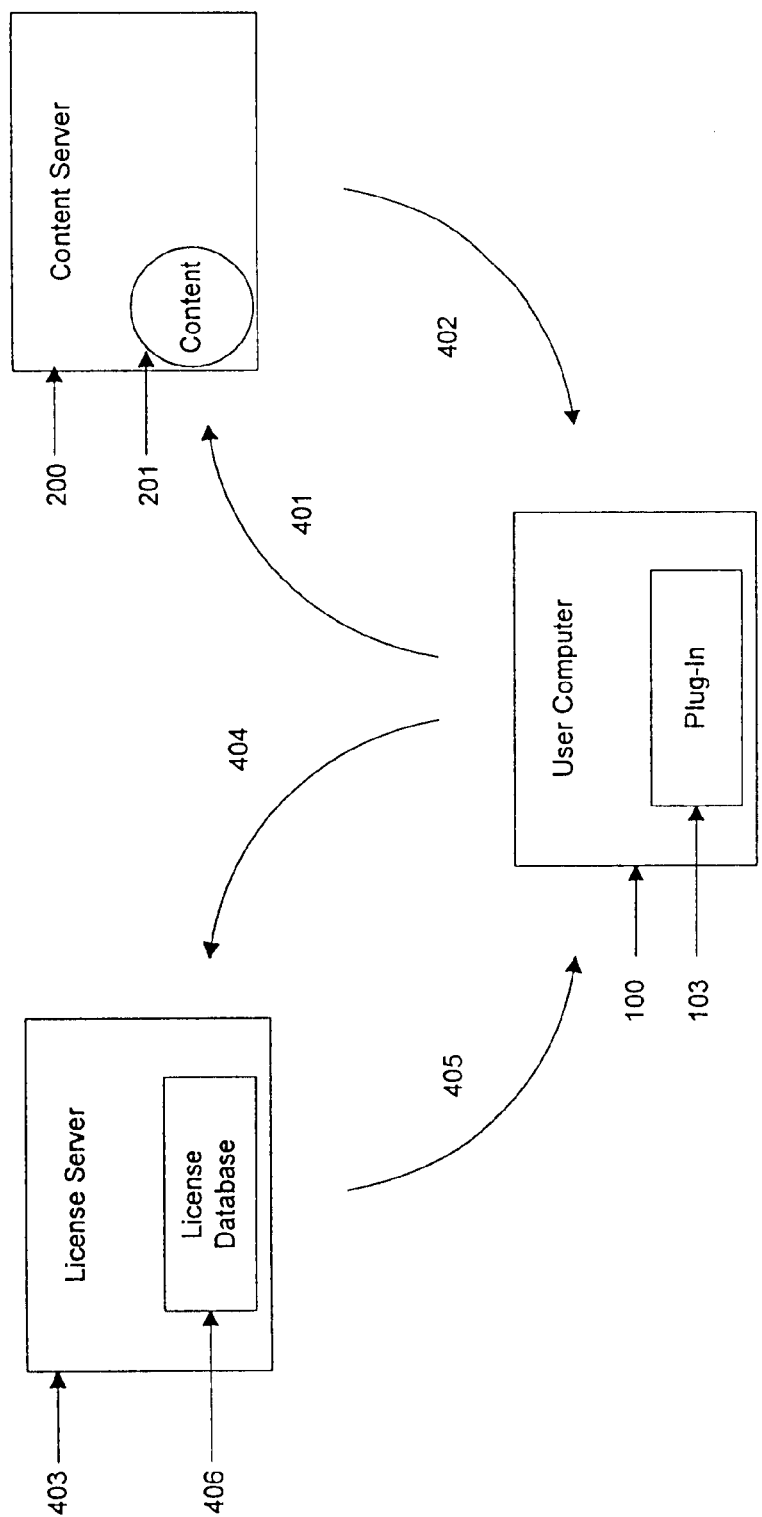
FIG. 4 is a block diagram illustrating the flow of interactions between a computer system with a plug-in or application for receiving licensed content, a server for providing licensed content and a license server according to the invention.

FIG. 4 illustrates the flow of information between a user computer 100, a license server 403 and a content server 200 under the invention. The user computer 100 sends requests 401 over the network to the content server 200 for content 201. The content server 200 sends responses 402 back to the user computer containing the requested content 201. The plug-in 103 running on the user computer 100 ultimately receives this content 201.

During operation, the plug-in 103 on the user computer 100 scans the content 201 for the {License . . . } form prior to actual execution or interpretation of the content. If the {License . . . } form is found, it is interpreted by the plug-in. Depending upon the contents of the {License . . . } form, a request 404 may be placed to the license/authorization server 403.

In explicit licensed content, the {License . . . } form 300 will contain at least a portion of the encoded information (303 of FIG. 3). In order to verify the validity of this form of license, the plug-in causes a request for license validation 404 to be generated based in part on the contents of the {License . . . } form and sent to the authorization server 403. The authorization server 403 receives the request 404 from the user's system 100. Authorization server 403 may be the same server as the content server 200, but in the present example, the authorization server 403 is a separate computer. The authorization server then generates a response 405 dependent upon information in the request 404 and the license database 406.

The flow charts of FIGS. 5–10 illustrate the actual sequence of steps performed by embodiments of the plug-in when validating a {License . . . } form.

Figure 5:
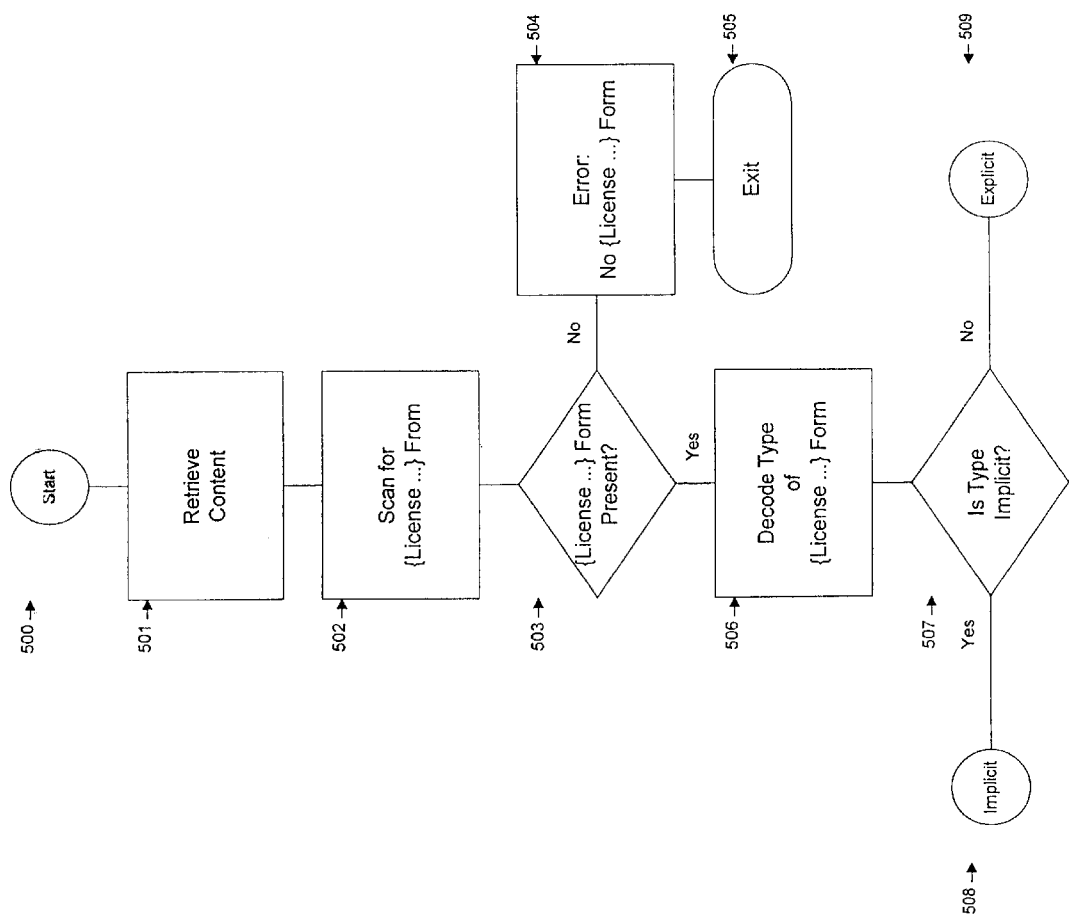
FIG. 5 is a flow chart illustrating a portion of the steps performed by the plug-in of the invention when determining the type of license within the {License . . . } form found within licensed content.

With reference to FIG. 5, the plug-in performs the initial sequence of steps in retrieving and determining the type of license designated by the {License . . . } form. At step 500, the plug-in is in the initial state ready to retrieve content located on a server. In step 501, the plug-in retrieves the content from the server. This retrieval can be initiated by the user (e.g. the user clicks on a hyper-text link causing the plug-in to retrieve the content) or under operation of previously loaded content (e.g. operations of the previously loaded content direct the plug-in to retrieve content.) In a typical embodiment of the invention, the actual transport mechanism for retrieving content from the server is provided by the underlying browser and operating system, but it is anticipated that in other embodiments of the invention (for instance, for use in a stand alone dedicated computer or consumer set-top box) the plug-in might include the retrieval mechanism.

At step 502, the plug-in scans the content for the {License . . . } form. Typically, the form will be at the top of the file to minimize the time required for scanning the content. If there is no {License . . . } form within the content, it is signaled as an error, step 504, and the plug-in exits this routine, step 505.

Assuming at least one {License . . . } form is found, it is decoded to determine the type of license, step 506. The plug-in branches at step 507 depending upon the type of license with the {License . . . } form. As illustrated here, there are two forms of license, an implicit and explicit license, but it is anticipated that other forms of license can be created. If the license is implicit, it branches to steps starting at step 508, otherwise it branches to step 509.

Figure 6:
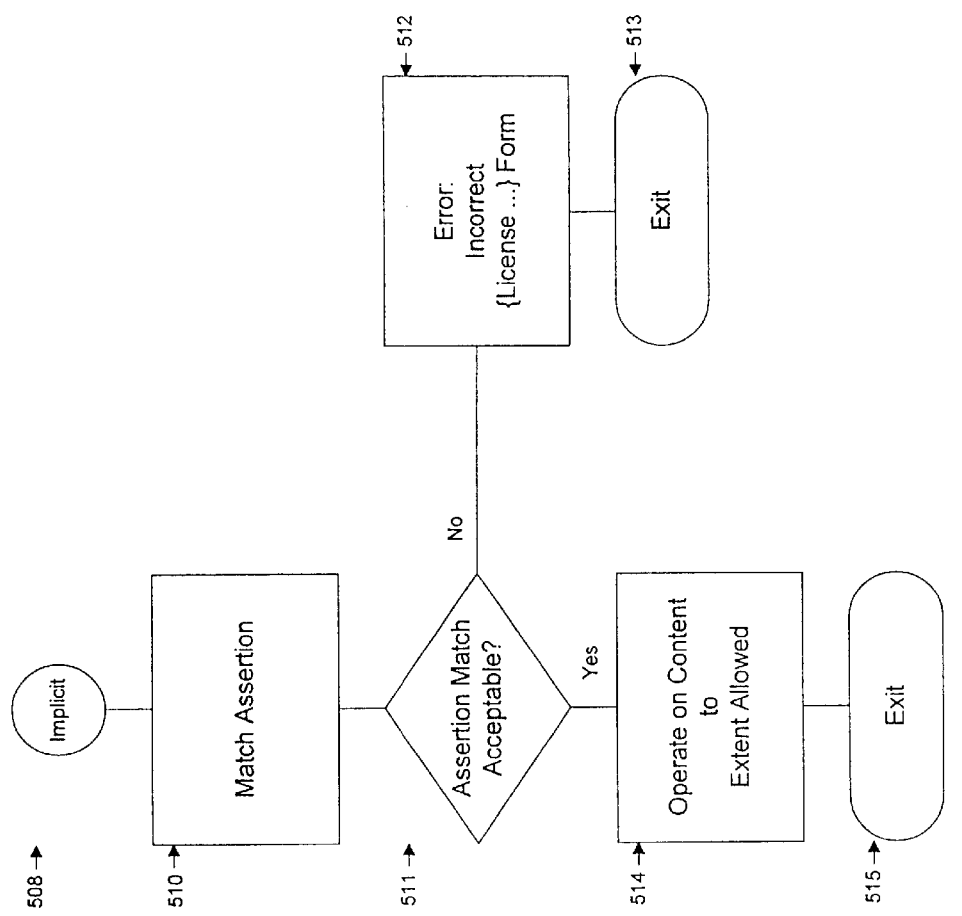
FIG. 6 is a flow chart illustrating a portion of the steps performed by the plug-in of the invention when validating an implicit license.

Turning to FIG. 6, if the {License . . . } form specifies an implicit license, the validity of the license is now checked. At step 510, the implicit license is checked by simply matching the string text containing the legal assertion found within the file to a predefined text string retained in the plug-in. At step 511, if the match fails, the plug-in executes the necessary error operations for this error, step 512, and exits this function at step 513. If the match passes, the plug-in operates on the content to the extent allowed. The extent of operation is determined by the functionality provided in the plug-in, and if, for this type of license (here an implicit license), what level of functionality is actually granted. Once the plug-in is allowed to operate on the content, this function is exited at step 515.

Figure 7:
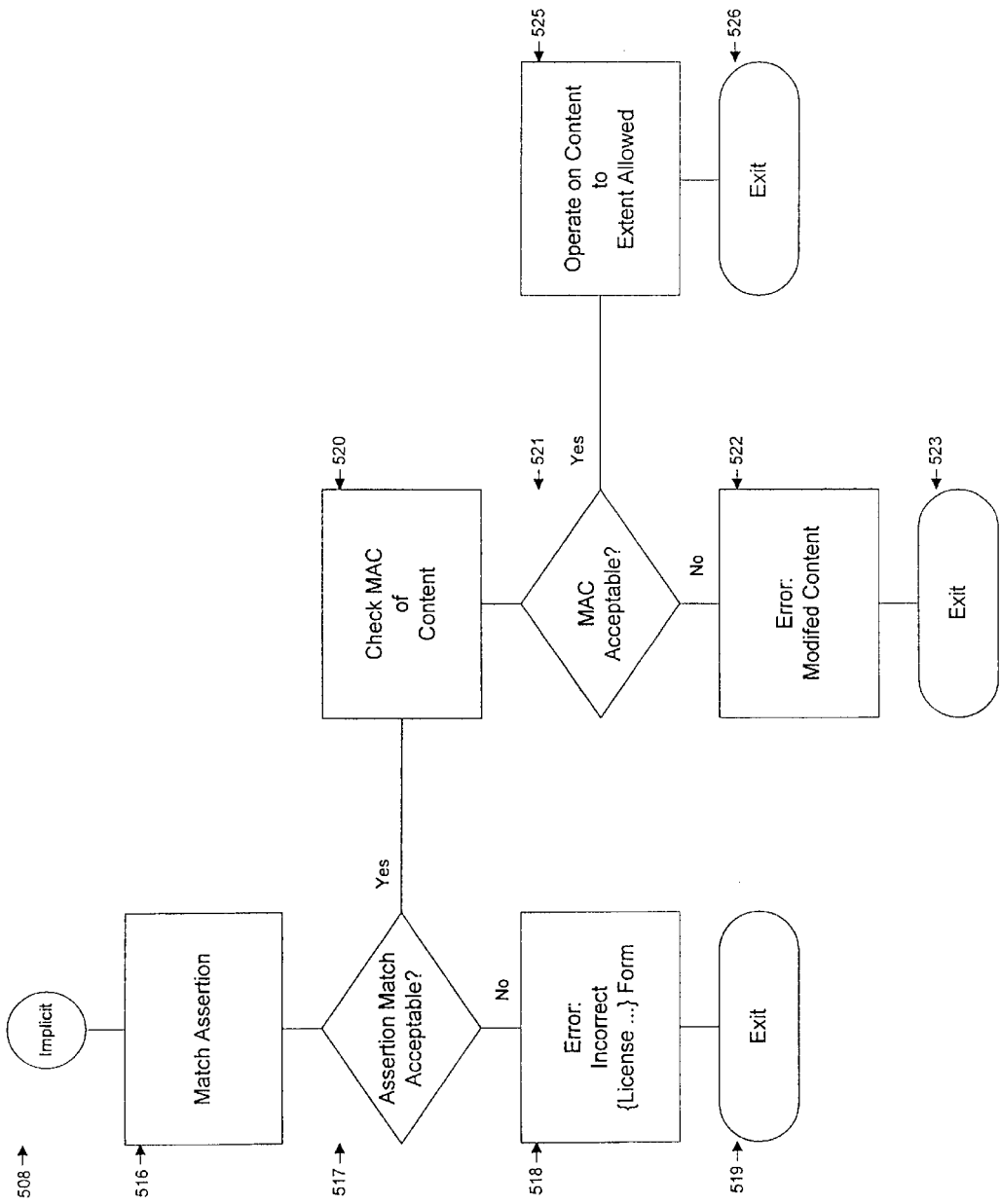
FIG. 7 is a flow chart illustrating a portion of the steps performed by the plug-in of the invention when validating an implicit license containing a file authenticator of the content.

FIG. 7 illustrates an alternative embodiment of the invention for operating on an implicit license where the content is secured by a MAC. At step 516, the implicit license is checked by simply matching the string text containing the legal assertion found within the file to a predefined text string retained in the plug-in. At step 517, if the match fails, the plug-in executes the necessary error operations for this error, step 518, and exits this function at step 519. If the match passes, the plug-in checks the MAC found within the {License . . . } form, step 520. If the MAC is tested and found to be incorrect at step 521, (indicating that the content has been corrupted and should not be operated upon) then an error condition is signaled, step 522, and this function exits at step 523. If the MAC is found to be proper at step 521, then the plug-in operates on the content to the extent allowed, step 525, and this function exits at step 515. In the fashion of adding the MAC, other functions can be provided by the {License . . . } form.

Figure 8:
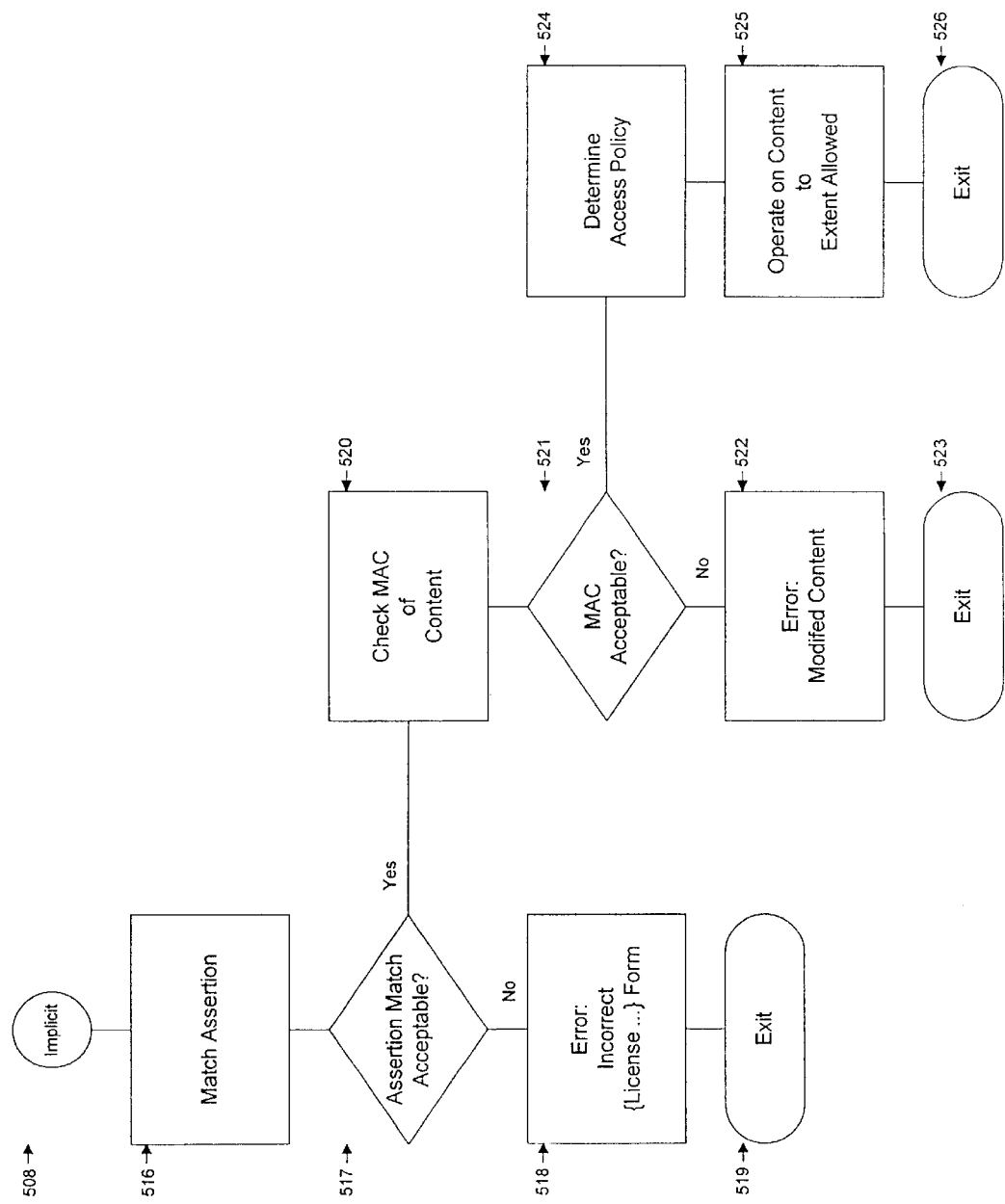
FIG. 8 is a flow chart illustrating a portion of the steps performed by the plug-in of the invention when validating an implicit license containing a file authenticator of the content and further determining an access policy.

FIG. 8 illustrates an additional extension. The steps illustrated here are the same as those in FIG. 7, except for the addition of step 524, where the plug-in determines an access policy appropriate for this license. The access policy can limit access to certain functionality within the plug-in. Thus, for non-commercial use a basic set of functions may be made available for free use while at the same time withholding access to advanced features for commercial use via the explicit licensing regime, as described below.

Figure 9:
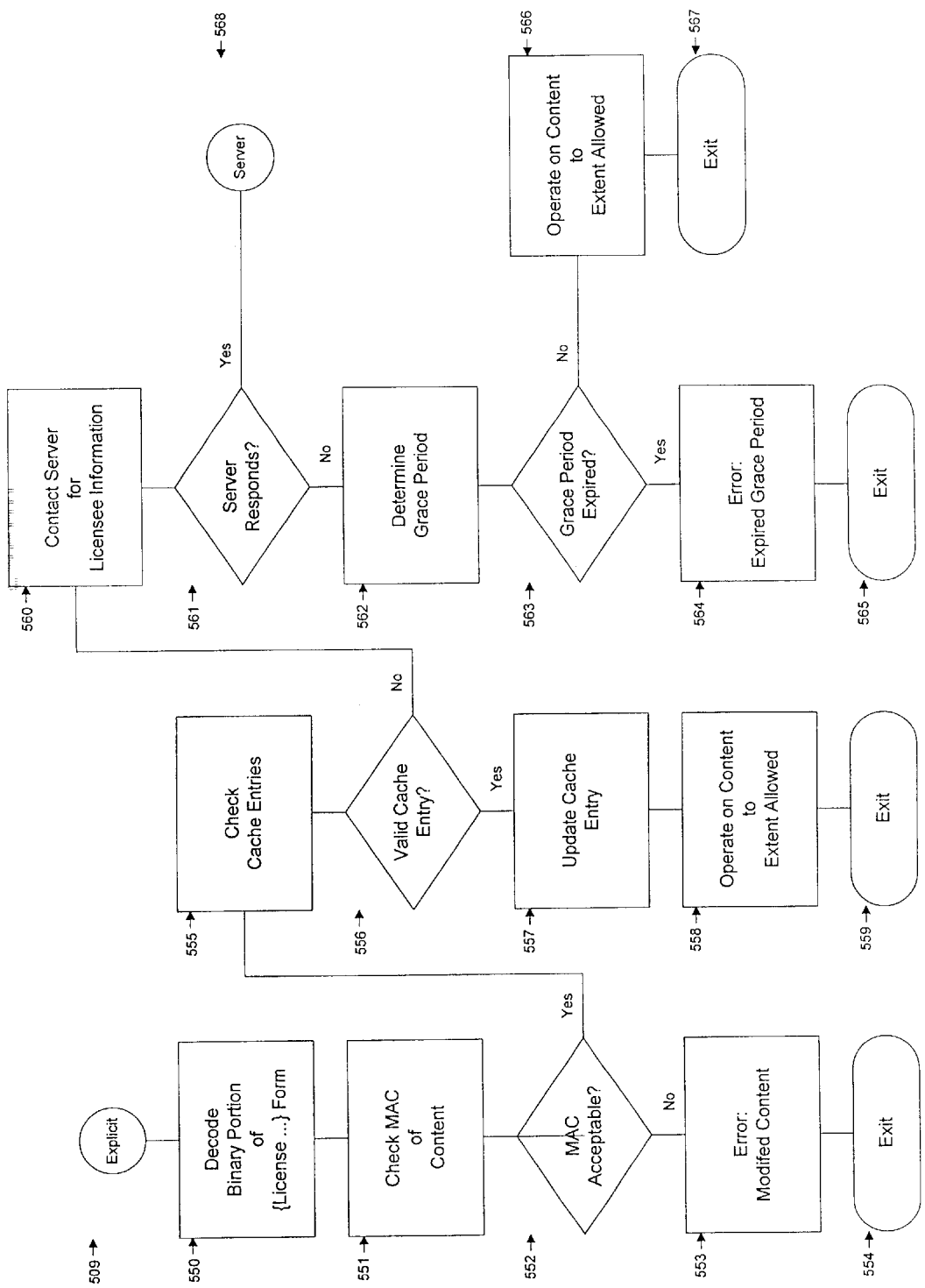
FIG. 9 is a flow chart illustrating a portion of the steps performed by the plug-in of the invention when validating an explicit license containing a file authenticator of the content and further utilizing a cache of valid license results, and grace period.

FIG. 9 illustrates the steps, starting at 509, performed by the plug-in when it is determined that the license is an explicit license. In explicitly licensed content, the {License . . . } form will always have an encoded portion (303 of FIG. 3) containing additional information needed to validate the license. At step 550, the encoded information is decoded. Depending upon the encoding, a variety of levels of security surrounding access of the encoded information can be provided. For instance, the encoding can be accomplished by a simple binary encoding or, alternatively, by utilizing a public or private key infrastructure to both encrypt and encode this data.

At step 551, a MAC of the contents is computed to determine whether the contents have been corrupted or the {License . . . } form is illegally generated or copied. If the MAC is not acceptable, step 553, an error condition is signaled, step 553, and the routine exits 554. If the MAC is correct, at step 555 a cache is checked to see if a prior approved {License . . . } form applies to the content under examination. If a cache entry is found that applies to the content, tested at step 556, then the cache entry is updated at step 557 (to allow for aging of the entry via an access count, usage limit or other aging mechanism). The plug-in is then allowed to operate on the content to the extent allowed by the license, step 558, and the routine exits at step 559.

If there isn't a valid cache entry, then a license server needs to be contacted at step 560. Identification of the license server can be built into the plug-in, specified by the encoded information (303 of FIG. 3), specified by another server or built into the content. The plug-in attempts to contact the license server and pass the necessary information from the plug-in to the license server as required for validation of the license. The necessary information can include one or all of the following: licensee identity, content identity, user identity, machine identity, contract identity, use count, etc. The information can be passed to the license server via a secure communications link as known in the art to protect the communications from interception.

One important aspect of the invention is that some of the encoded information (303 of FIG. 3) found within the {License . . . } form can actually be stored on the license server by design choice. For instance, the license server can specify a timeout period for a cache entry for this content, specify an additional verification site, specify the modules the license applies to, specify the grace period applicable for this content, etc. Thus, by storing the information on the license server, the values can change across all accesses of the content without requiring a change to the {License . . . } form in the content. In addition, with a user or machine identification, a customized access policy can be created on a per machine or per user basis. Finally, even if the encoded information (303 of FIG. 3) includes certain information, that information can be overridden by information found on the license server.

If the license server does not respond, step 561, then a grace period may apply, step 562, even if there isn't a cache entry nor a response from the server. A grace period is an optimization to enable disconnected operations. For instance, content may be stored on the user's machine for later access. If the user is not connected onto the network containing a license server, then without a cache entry from a previous access, operation of the content would be denied. With a grace period specified, the content can be utilized a certain number of times or during a certain time period without requiring access to the license server. If the grace period is expired; step 563, an error is signaled, step 564, and the content is not operated upon and the routine exits, step 565. If the grace period applies and is valid, then the content is operated to the extent allowed by the license, step 566, and the routine exits.

Figure 10:
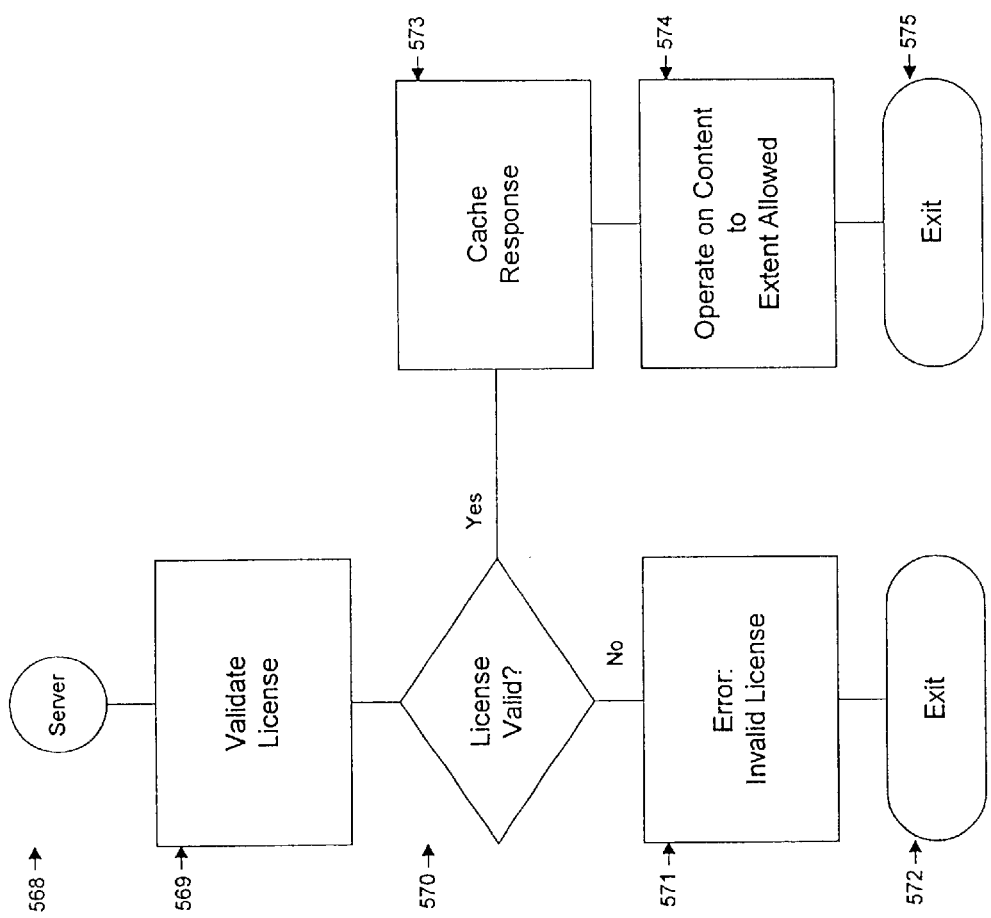
FIG. 10 is a flow chart illustrating a portion of the steps performed by the plug-in of the invention when validating an explicit license containing a file authenticator of the content and further utilizing a cache of valid license results, and grace period.

FIG. 10 illustrates the steps in contacting the server for one embodiment of the invention. If a server responds, we enter at step 568. The response from the license server will typically include additional information, as already noted. The information received is used to validate or invalidate the license. If the response invalidates the license, step 570, then an error is signaled, step 571, and the routine exits, step 572. If the response validates the license, then an entry is created in the cache for the content, step 573, and the content is operated on to the extent allowed under the license, step 574, and the routine exits, step 575.

FIGS. 5–10 are only meant as examples of various embodiments of the licensing mechanism. One of ordinary skill in the art can appreciate that additional extensions and modifications are possible. For instance, the information contained in the {License . . . } form can be augmented, the information stored on the server can be augmented, the encryption and encoding algorithms can be changed, the communications method can be varied and all fall within the scope of the invention.

Extensions

Although the user computer—authorization server exchange can be made quite brief, it does add a small overhead to each execution of the licensed content. As already shown, this overhead can be reduced by caching the server response on the client (e.g., within a "cookie" or similar client state), along with a specified timeout interval used to age the cookie and thus control its life. The cached result can apply to future related content retrieved. As shown, a request to execute a licensed file, the plug-in would thus check its local cache for related records of affirmation of validity by the Licensor's authorization server. It would exchange messages with the Licensor's server only if it found no such record or if the record found was older than the specified timeout.

Various implementations of the timeout mechanism are possible. For instance, the actual timeout interval for the cached response might be constant (built into the plug-in), specified within the {License . . . } form, or specified by the Licensor's server in its response to the validation request. The timeout interval may be based upon passage of time, number of accesses or a combination thereof.

In addition, the relationship of the cached server response with future content retrieved by the user can also be configured. For instance, if the content is organized in a hierarchy, the cached response for a particular node can apply to that node and all nodes lower in the hierarchy or a limited number of lower nodes. Alternatively, the {License . . . } form or the response from the server can specify the content for which it applies. Thus, the cached response is flexible and can be adapted to support the licensee's particular content.

An alternative to the validation steps illustrated in FIGS. 5–10 above is to modify the contact with the license server to take place in the background. This would allow "lazy authentication" of the license, where the license is validated only as needed and then in parallel with operation on the content. From the user's perspective, this could eliminate or diminish any delays caused by the interactions between the user computer and the license computer prior to validation and thus operation of the content.

To save client storage and minimize the plug-in size, the {License . . . } form may be digested via a cryptographic hash such as MD5 or SHA1 (*Applied Cryptography*, Second Edition, By Bruce Schneier, John Wiley & Sons, 1996) into a smaller form to be compared against stored values. Alternatively, the plug-in might deal with all {License . . . } forms by contacting the licensor's server, sending a validation request containing a short cryptographic hash of the form, and then caching the result to avoid the need for future validations. This approach allows the set of implicit {License . . . } forms to grow dynamically, under control of the Licensor via his server. In addition, the use of a cache timeout would allow the licensor to revoke implicit licenses, since the cached validation at the user computer will eventually expire.

The encoding of the encoded information (303 of FIG. 3) of the {License . . . } form can be constructed from C, the MAC of the file contents, and some recognizable constant as follows:

Encode(Encrypt(Append(Hash(Append(C, MAC(remainder of file)), C, MAC(remainder of file)), SecretKey))

where Append simply concatenates the bit strings representing its arguments, Hash computes a non-invertable cryptographic hash of its arguments, Encrypt(bits, key) is a standard encryption scheme such as DES, and Encode is a character encoding function such as uuencode. SecretKey is a synunetric encryption key known only to the licensor. The hashing and encryption steps discourage attempts to separate the C and MAC components of the encoded binary data and recombine them in forged {License . . . } forms.

Since occasional re-validation of each explicit (and some versions of implicit) license is required, the licensor's license server can collect statistics yielding a rough model of the active user base served by each license. The licensor might, for example, send weekly reports to each licensee relating the number of active users (and perhaps asking the licensee to upgrade if that number exceeds the terms of the license). By appropriately specifying the cache timeout, the scope of a cache entry and the hierarchy of the content, a licensor may additionally generate reports of flow of access through the store of content on the server, and thus be able to identify those content areas that are over or under utilized.

In embodiments described here, the invention is designed so that substantive processing of the encoded binary data can happen entirely on the server, freeing the client software from the need to include sophisticated encryption routines. Within the present invention, however, these and other functions can be relocated between the plug-in and the licensor's server, using network communication with standard security measures as necessary.

License Generation

In order for a licensee to create content licensed for use on the plug-in, the licensee must be able to affix the cryptographic {License . . . } form to the content files it creates. To this end, the licensor will supply the licensee with a certification tool, namely a program specific to the appropriate contract (and hence specific to that licensee) which takes as input an unlicensed file and affixes the appropriate {License . . . } form to it. The certification tool is intended only for use by a particular licensee, and will not be distributed publicly.

In the event the security of the tool becomes compromised, the licensor can react by revoking the license it produces, and issuing the licensee a new tool which implements a fresh (uncompromised) license. The tool deletes any earlier {License . . . } form as necessary, and generates a fresh copy based on current licensing terms and the remaining contents of the supplied source file. The tool may be completely self-contained, relying on internal coding and encryption mechanism, or may operate in conjunction with a server maintained by a particular licensor. At its extreme, under the latter approach a {License . . . } form can be created by transmitting the content file (or the MAC of the file) via a secure link to the license creation server. The license creation server would then generate the necessary information and send it back in response. An advantage of this approach is that the tool containing a licensor's cryptographic information is kept under the control of the licensor.

Multi-layer Licensed Software

Figure 11:
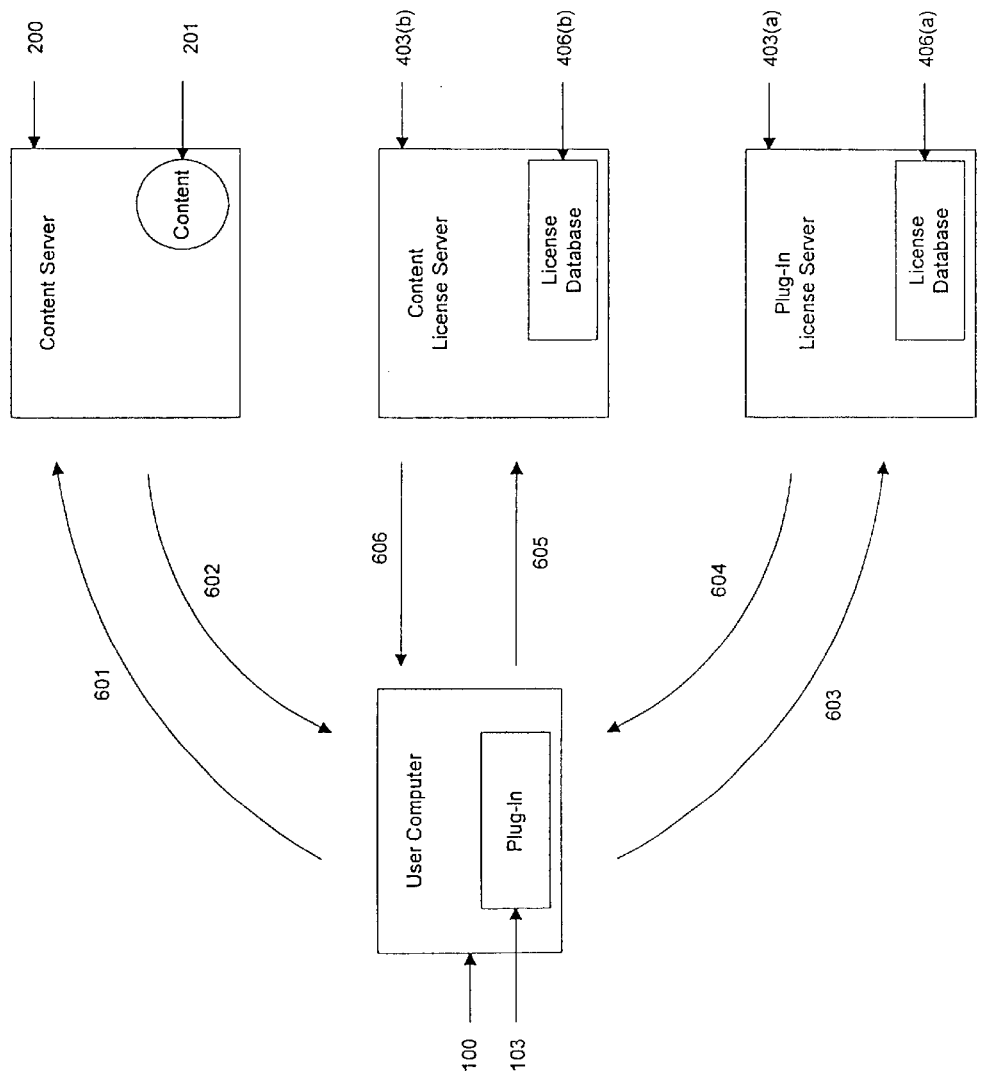
FIG. 11 is a block diagram illustrating the flow of interactions between a computer system with a plug-in or application for receiving licensed content, a server for providing licensed content and two license servers according to the invention.

The {License . . . } form can be extended to support multiple licensor-licensee relationships. For instance, the system can support a relationship as shown in FIG. 11. In this example, the plug-in can be licensed to a content provider to develop and deploy an application. In this case, the licensor is the plug-in creator and the licensee is the content creator/provider. In turn, the content provider can license the content to a user. In this situation the licensor is the content creator/provider and the licensee is the user.

The operations will parallel the examples previously illustrated, but now extended to handle two licensor-licensee relationships. The user computer 100 requests 601 the content 201 from the content server 200. The content server 200 answers 602 with the content 201. Plug-in 103 scans the content for {License . . . } forms. In this case, it encounters two forms (or a single combined form) in the content.

One {License . . . } form relates to the plug-in provider and content provider relationship. The plug-in 103 contacts 603 the plug-in license server 403(*a*) in order to validate the related {License . . . } form. License server 403(*a*) retrieves the appropriate information from the license database 406(*a*) and responds 604 to the plug-in 103.

The other {License . . . } form relates to the content provider and user relationship. Again, the plug-in 103 contacts 605 the content license server 403 (*b*) in order to validate the related {License . . . } form. License server 403(*b*) retrieves the appropriate information from the license database 406(*b*) and responds 606 to the plug-in 103.

Depending upon the responses received, the plug-in operates on the content accordingly. Each of the two {License . . . } forms can have different settings (i.e. different grace, cache timeout etc.) thus enabling the license interactions to be customized accordingly. For instance, the plug-in provider can provide a long timeout for caching entries for this particular licensee and thus minimize traffic to the plug-in provider license server.

This general substrate can be further extended in embodiments of the invention to allow licensed modules to refer to each other. For instance, separately sourced content and software modules can refer to each other. In CURL, the form:

{require<file locator>. . . } specifies that execution of the module containing the {require . . . } form depends on access to another module identified by the specified file locator (typically, a Universal Resource Locator or URL). When the plug-in encounters such a dependency, it must fetch and import the specified or "required" module. Both the required and requiring module will contain {License . . . } forms, which may specify the same or different licenses and licensees for the respective modules. In the general and most interesting case, the modules are from different developers.

For example, company B may provide high-performance Curl audio software, B.curl, of interest to other Curl developers, and company A might produce a Curl application A.curl which requires B.curl. Both A and B are licensees of Curl Corporation; but it is useful to provide additional support for A to become also a licensee of B. To this end, we provide a mechanism for allowing third-party software vendors to utilize aspects of our invention to administer their software licenses.

The form

{Licensor<name of licensor> <encoded binary data>} appearing within a file is used to establish that the containing content module is subject to licensing restrictions in addition to those involving the plug-in itself. The name of licensor section is plain text, and identifies the licensor (and optionally other pertinent details) in human-readable form. The encoded binary data includes, perhaps in encrypted form, a URL or other identifier of one or more servers that administer the indicated license. In the above example, the form {Licensor B Corporation <encoded binary data>} would appear within file B.curl to indicate that its use is subject to licensing restrictions imposed by B Corporation.

The {require . . . } form which indicates a dependency on external content may include an optional {License . . . } form, properly nested as a clause within the {require . . . } form. The {License . . . } clause has structure and function analogous to the {License . . . } form already described, except that its embedding within a {require . . . } form indicates that it pertains to a license from the Licensor declared in the required module.

In our example, file A.curl might include the form

```
{require "/web/www.B.com/B.curl"
    {License by A
        <encoded binary data>}
    ...}
``` where the string "/web/www.B.com/.curl" is a URL or other reference to the module required by A.curl, and where the {License by . . . } clause contains within its encoded binary data the components previously described necessary for B's server to validate A's license status. On encounter of the above form within A.curl, the plug-in will first load B.curl appropriately (satisfying all of its {require . . . } forms and validating its licenses as required. It will then validate A's use of B.curl as previously described, using the data from the {License by A . . . } form from the above {require . . . } together with the server identified in the {Licensor . . . } form found within B.curl. B may provide implicit licenses, using B's server to validate each {License for . . . } clause dynamically as previously described.

As part of A's licensing arrangement with B, A receives a certification tool from B which allows A to add the {License . . . } clause to the {require . . . } form within modules created by A. This tool operates in generally the same fashion as the certification tool previously described, except that it generates a clause rather than a top-level {License . . . } form.

Figure 12:
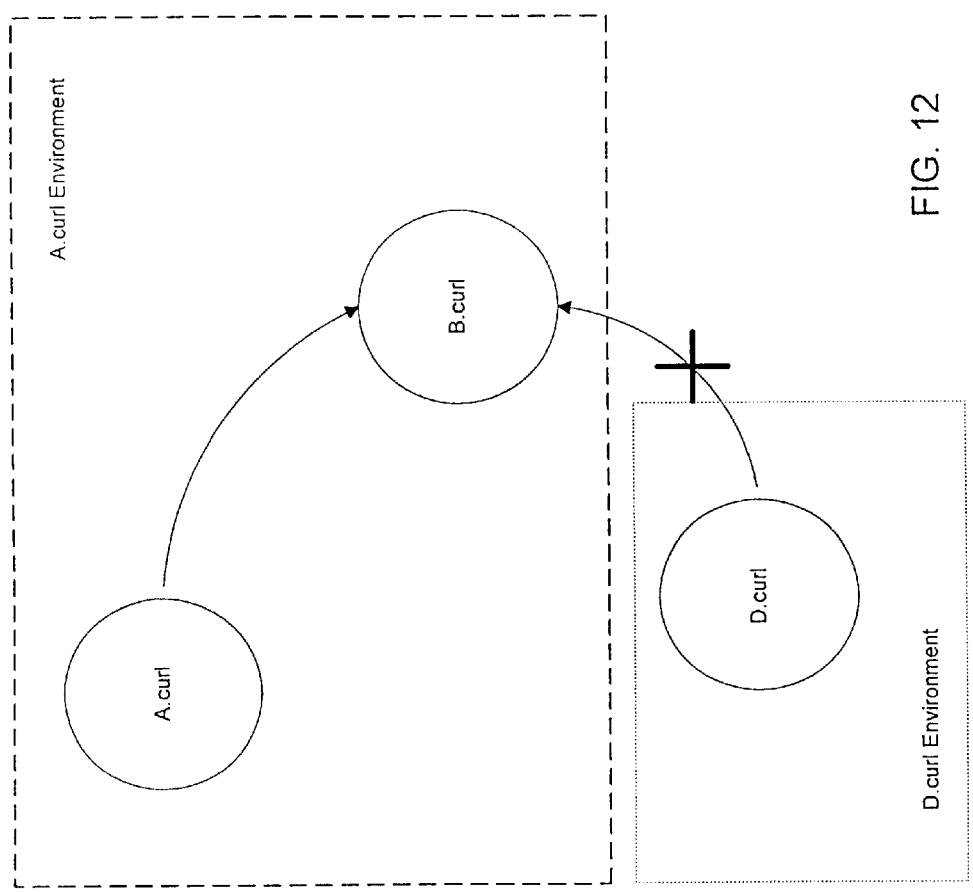
FIG. 12 is a block diagram illustrating environments created during multi-level licensing.

Using this approach, B is able to license the use of B.curl by A, rather than simply licensing every use of B.curl by this client. As illustrated in FIG. 12, even while A.curl is gainfully using B.curl on a given client, B can prevent the unlicensed D.curl from using B.curl. B.curl is depending on the plug-in's ability to segregate modules of functionality such that only approved interactions and interdependence obtain. Modern operating systems do that, as do typical systems for mobile code such as Java (Sun Microsystems, Inc. Palo Alto, Calif.) and Safe-TCL (*The Safe-Tcl Security Model,* Jacob Y. Levy and Laurent Demailly, Sun Microsystems Laboratories; John K. Ousterhout and Brent B. Welch, Scriptics Inc. USENIX Annual Technical Conference (NO 98), 1998, Jun. 15–19, 1998, New Orleans, La., USA). Moreover, B.curl can similarly require licensed software from additional vendors, under separately maintained licenses. In effect, the supplier of the plug-in can extend its licensing advantages to arbitrary software vendors.

Other Embodiments

Many variants of the described embodiment will be apparent to those skilled in the art. Some or all of the content may be coded in binary, either as instructions for a real or virtual machine or as an intermediate representation requiring further interpretation or translation.

Various additional data fields may be included in the {License . . . } form, relating to additional features offered by the client plug-in. For example, the licensor may offer additional user authentication features at the option of the licensee. Thus, when present, this data field signifies that the plug-in should request identification and password information from the user, and optionally verify it by communication with the Licensee's server.

In additional embodiments of the invention, the plug-in can initially contain only those instructions needed for interpreting the {License . . . } form and for loading the necessary modules. In this case the plug-in includes, or the {License . . . } form provides, the identity of at least one server capable of providing the necessary modules to the client in response to a download request. As modules are downloaded they are stored on the client and utilized as needed. In further embodiments, the client can dynamically release the modules depending upon the time of last access or such other metric. This allows for a very small plug-in as all other modules are subsequently downloaded from a server as required in response to the content and the {License . . . } form within the content. In the embodiments incorporating a mechanism for dynamically releasing modules, the space they occupy can be reclaimed for reuse thus allowing a client to have a minimal module storage area.

The mechanism of this invention includes elements of authentication and certification that may play useful roles unrelated to the objects of the present invention, for example pursuant to privacy or security goals. In applications of the invention sharing these additional goals, the coding of information within {License . . . } forms may advantageously be combined with other information and mechanism serving these additional purposes. The combination of licensing and security mechanisms may be optimized in ways that will be obvious to those skilled in the art, eliminating redundancy from the combined implementation.

The client execution vehicle need not be a browser plug-in as described here. It might be an application, applet, dynamically linked library (DLL), ActiveX control, or any other form of executable code.

What is claimed is:

1. A method for managing access to a functionality provided by a software component running on a first computer, the method comprising the steps of:
   (a) maintaining a store of license records, each of the license records including at least an identification of a licensee and an associated licensee functionality, the licensee functionality used to define an access policy for said licensee;
   (b) retrieving specific content for running on the software component, the content containing a license form containing either a licensee identity or an operational policy;
   (c) scanning the specific content for the license form for the licensee identity and operational policy;
   wherein the license form contains a licensee identity, and performing the steps of
      d1) retrieving the license record from the store,
      d2) determining an access policy for the licensee based upon at least the licensee functionality found in the license record, and
      d3) allowing the software component to operate on the specific content to the extent allowed by the access policy;
   wherein the store of license records is maintained on a plurality of license computers, and the license form further contains identification of a set of specific license computers, the step d1) of retrieving the license record further comprising:
      sequentially stepping through the set of specific license computers, sending a request containing an indication of the licensee identity to each member of the set of specific license computers until at least one of the set of specific license computers responds to the request; and
      receiving a response from the at least one of the set of specific license computers.

2. A method for managing access to a functionality provided by a software component running on a first computer, the method comprising the steps of:
   (a) maintaining a store of license records, each of the license records including at least an identification of a licensee and an associated licensee functionality, the licensee functionality used to define an access policy for said licensee;
   (b) retrieving specific content for running on the software component, the content containing a license form containing either a licensee identity or an operational policy;

(c) scanning the specific content for the license form for the licensee identity and operational policy;

wherein the license form contains a licensee identity, and performing the steps of
- d1) retrieving the license record from the store,
- d2) determining an access policy for the licensee based upon at least the licensee functionality found in the license record, and
- d3) allowing the software component to operate on the specific content to the extent allowed by the access policy;

wherein the store of license records is maintained on a plurality of license computers, and the license form further contains identification of at least two specific license computers, the step d1) of retrieving the license record further comprising:
- sending a request containing an indication of the licensee identity to each of the at least two specific license computers; and
- receiving a response from each of the at least two specific license computers.

3. The method of claim 2 the step e2) further comprising:
determining an access policy for the licensee based upon all the licensee functionality found in all the received licensee records.

4. A method for managing access to a functionality provided by a software component running on a first computer, the method comprising the steps of:
- (a) maintaining a store of license records, each of the license records including at least an identification of a licensee and an associated licensee functionality, the licensee functionality used to define an access policy for said licensee;
- (b) retrieving specific content for running on the software component, the content containing a license form containing either a licensee identity or an operational policy;
- (c) scanning the specific content for the license form for the licensee identity and operational policy;

wherein the license form contains a licensee identity, and performing the steps of
- d1) retrieving the license record from the store,
- d2) determining an access policy for the licensee based upon at least the licensee functionality found in the license record, and
- d3) allowing the software component to operate on the specific content to the extent allowed by the access policy;

wherein the plurality of license computers is divided into at least a first portion and a second portion, and the license form further contains identification of at least two specific license computers, each of the least two specific license computers from different portions of the plurality of license computers, the step d1) of retrieving the license record further comprising:
- sending a request containing an indication of the licensee identity to each of the at least two specific license computers; and
- receiving a response from a portion of the at least two specific license computers.

5. The method of claim 4, the step e2) further comprising:
determining an access policy for the licensee based upon all the licensee functionality found in all the received licensee records.

6. A method for managing access to a functionality provided by a software component running on a first computer, the method comprising the steps of:
- (a) maintaining a store of license records, each of the license records including at least an identification of a licensee and an associated licensee functionality, the licensee functionality used to define an access policy for said licensee;
- (b) retrieving specific content for running on the software component, the specific content containing a license from containing either a licensee identity with a content verifier or an operational policy; and
- (c) scanning the specific content for the license form for the licensee identity and operational policy;

wherein the license form contains a licensee identity, and performing the steps of
- d1) retrieving the license record from the store,
- d2) determining an access policy for the licensee based upon at least the licensee functionality found in the license record,
- d3) verifying the specific content by utilizing the content verifier, and
- d4) operating on the specific content to the extent allowed by the licensee functionality; and wherein the step d3) occurs before the step d1).

7. A method for managing access to a functionality provided by a software component running on a first computer, the method comprising the steps of
- a) maintaining a store of license records, each of the license records including at least an identification of a licensee and an associated licensee functionality, the licensee functionality used to define an access policy for said licensee;
- b) maintaining a store of verified license results, each of the verified license results including information relating to a set of content, and further including licensee functionality for each verified result;
- c) retrieving a first content for running on the software component, the first content containing a license form containing either a licensee identity with a content verifier or an operational policy;
- d) scanning the first content for the license form for the licensee identity and operational policy;

wherein the license form contains a licensee identity, and performing the steps of
- e1) determining if one of the verified license results in the store of verified license results applies to the first content, if so skipping to step e5),
- e2) retrieving the license record from the store of license records,
- e3) determining an access policy for the licensee based upon at least the licensee functionality found in the license record,
- e4) storing a verified license result applicable to at least the first content in the store of verified license results, the verified license result derived in part from the license record,
- e5) verifying the specific content by utilizing the content verifier, and
- e6) operating on the specific content to the extent allowed by the licensee functionality; and wherein content comprises information stored in a hierarchical structure, the first content comprises a node in the hierarchical structure and the set of content comprises nodes lower than a particular node in the hierarchical structure, the step e1) of determining further comprises:
- searching the store of verified license results for at least one verified license result applicable to the first content by determining if the first content is with the information relating to the set of content for the at least one license result.

8. The method of claim 7 wherein the set of content comprises all nodes lower than a particular node in the hierarchical structure.

9. The method of claim 7 wherein the set of content comprises a fixed number of nodes lower than a particular node in the hierarchical structure.

10. A method for managing access to a functionality provided by a software component running on a first computer, the method comprising the steps of:
   a) maintaining a store of license records, each of the license records including at least an identification of a licensee and an associated licensee functionality, the licensee functionality used to define an access policy for said licensee;
   b) maintaining a store of verified license results, each of the verified license results including information relating to a set of content, and further including licensee functionality for each verified result;
   c) retrieving a first content for running on the software component, the first content containing a license form containing either a licensee identity with a content verifier or an operational policy;
   d) scanning the first content for the license form for the licensee identity and operational policy;
   wherein the license form contains a licensee identity, and performing the steps of
      e1) determining if one of the verified license results in the store of verified license results applies to the first content, if so skipping to step e5),
      e2) retrieving the license record from the store of license records,
      e3) determining an access policy for the licensee based upon at least the licensee functionality found in the license record,
      e4) storing a verified license result applicable to at least the fist content in the store of verified license results, the verified license result derived in part from the license record,
      e5) verify the specific content by utilizing the content verifier, and
      e6) operating on the specific content to the extent allowed by the licensee functionality; and
   wherein the store of verified license results is a temporary store, each of the verified license results further includes information relating to aging, and the step e1) of determining further comprises checking the information relating to aging in the one of the verified license results.

11. The method of claim 10 wherein the information relating to aging includes expiration time data and the step e1) of checking the information relating to aging further comprises checking the expiration time.

12. The method of claim 10 wherein the information relating to aging includes expiration time data and the step e1) of checking the information relating to aging further comprises updating the expiration time.

13. The method of claim 10 wherein the information relating to aging includes access count data and the step e1) of checking the information relating to aging further comprises checking the access count.

14. The method of claim 10 wherein the information relating to aging includes access count data and the step e1) of checking the information relating to aging further comprises updating the access count.

15. A method for managing access to a functionality provided by a software component running on a first computer, the method comprising the steps of:
   a) maintaining a store of license records, each of the license records including at least an identification of a licensee and an associated licensee functionality, the licensee functionality used to define an access policy for said licensee;
   b) maintaining a store of verified license results, each of the verified license results including information relating to a set of content, and further including licensee functionality for each verified result;
   c) retrieving a first content for running on the software component, the first content containing a license form containing either a licensee identity with a content verifier or an operational policy;
   d) scanning the first content for the license form for the licensee identity and operational policy;
   wherein the license form contains a licensee identity, and performing the steps of
      e1) determining if one of the verified license results in the store of verified license results applies to the first content, if so skipping to step e5),
      e2) retrieving the license record from the store of license records,
      e3) determining an access policy for the licensee based upon at least the licensee functionality found in the license record,
      e4) storing a verified license result applicable to at least the first content in the store of verified license results, the verified license result derived in part from the license record,
      e5) verifying the specific content by utilizing the content verifier, and
      e6) operating on the specific content to the extent allowed by the licensee functionality; and
   wherein content comprises information stored in an or organized collection, and the first content comprises a location in the organized collection and the set of content comprises nodes related to a particular location in the organized collection, the step e1) of determining further comprises:
      searching the store of verified license records for at least one verified license result applicable to the first content by determining if the first content is within the information relating to the set of content for the at least one verified license result.

16. The method of claim 15 wherein the set of content comprises all locations having a direct relationship to the particular node in the organized collection.

17. The method of claim 16 wherein the set of content comprises a fixed number of locations having a direct relationship to the particular node in the organized collection.

18. A method for managing access to a functionality provided by a software component running on a first computer, the method comprising the steps of:
   a) maintaining a store of license records, each of the license records including at least an identification of a licensee and an associated licensee functionality, the licensee functionality used to define an access policy for said licensee;
   b) maintaining a store of verified license results, each of the verified license results including information relating to a set of content, and further including licensee functionality for each verified result;
   c) retrieving a first content for running on the software component, the first content containing a license form containing either a licensee identity with a content verifier or an operational policy;
   d) scanning the first content for the license form for the licensee identity and operational policy;

wherein the license form contains a licensee identity, and performing the steps of
- e1) determining if one of the verified license results in the store of verified license results applies to the first content,
- e2) retrieving the license record from the store of license records,
- e3) determining an access policy for the licensee based upon at least the licensee functionality found in the license record,
- e4) storing a verified license result applicable to at least the first content in the store of verified license results, the verified license result derived in part from the license record,
- e5) verifying the specific content by utilizing the content verifier, and
- e6) operating on the specific content to the extent allowed by the licensee functionality; and wherein the store of license records is maintained on a license computer, and the step (e2) of retrieving the license record filter comprising:
- sending a request containing an indication of the licensee identity to the license computer; and
- receiving a response from the license computer containing the license record.

19. The method of claim 18 wherein the store of verified license results is a temporary store, each of the verified license results further includes information relating to aging, the step e1) of determining further comprises checking the information relating to aging in the one of the verified license results.

20. The method of claim 19 wherein the license record further includes licensee aging information, the step e4) of storing a verified license result includes storing the information relating to aging derived from the licensee aging information.

21. The method of claim 19 wherein the software component includes general aging information, the step e4) of storing a verified license result includes storing the information relating to aging derived from the general aging information.

22. The method of claim 19 wherein the first computer includes general aging information, the step e4) of storing a verified license result includes storing the information relating to aging derived from the general aging information.

23. A method for managing access to a functionality provided by a software component running on a first computer, the method comprising the steps of:
- a) maintaining a store of license records, each of the license records including at least an identification of a licensee and an associated licensee functionality, the licensee functionality used to define an access policy for said licensee;
- b) maintaining a store of verified license results, each of the verified license results including information relating to a set of content, and further including licensee functionality for each verified result;
- c) retrieving a first content for running on the software component, the first content containing a license form containing either a licensee identity with a content verifier or an operational policy;
- d) scanning the first content for the license form for the licensee identity and operational policy;

wherein the license form contains a licensee identity, and performing the steps of
- e1) determining if one of the verified license results in the store of verified license results applies to the first content,
- e2) retrieving the license record from the store of license records,
- e3) determining an access policy for the licensee based upon at least the licensee functionality found in the license record,
- e4) storing a verified license result applicable to at least the first content in the store of verified license results, the verified license result derived in part from the license record,
- e5) varying the specific content by utilizing the content verifier, and
- e6) operating on the specific content to the extent allowed by the licensee functionality; and wherein the step (e2) of retrieving the license record further comprises maintaining a count of access by the licensee.

24. The method of claim 23 wherein the step of maintaining the count of access further comprises storing the count of access on the first computer.

* * * * *

UNITED STATES PATENT AND TRADEMARK OFFICE
CERTIFICATE OF CORRECTION

PATENT NO. : 6,766,305 B1 Page 1 of 1
DATED : July 20, 2004
INVENTOR(S) : Lori J. Fucarile et al.

It is certified that error appears in the above-identified patent and that said Letters Patent is hereby corrected as shown below:

Column 18,
Line 6, delete "from" and insert -- form --.
Line 65, delete "with" and insert -- within --.

Column 20,
Line 32, delete "or".

Signed and Sealed this

Sixteenth Day of November, 2004

JON W. DUDAS
*Director of the United States Patent and Trademark Office*